Sept. 9, 1952 J. D. REID 2,610,296

ELECTROMAGNETIC WAVE INTERCEPTOR

Filed Jan. 13, 1950 6 Sheets-Sheet 1

INVENTOR.
JOHN DRYSDALE REID
BY Alden D. Redfield
Charles M. Hogan
ATTORNEYS

Sept. 9, 1952 J. D. REID 2,610,296

ELECTROMAGNETIC WAVE INTERCEPTOR

Filed Jan. 13, 1950 6 Sheets-Sheet 2

INVENTOR.
JOHN DRYSDALE REID
BY
Alden D. Redfield
Charles M. Hogan
ATTORNEYS

Sept. 9, 1952 J. D. REID 2,610,296

ELECTROMAGNETIC WAVE INTERCEPTOR

Filed Jan. 13, 1950 6 Sheets-Sheet 3

INVENTOR.
JOHN DRYSDALE REID
BY Alden D. Redfield
Charles M. Hagan
ATTORNEYS

Sept. 9, 1952 J. D. REID 2,610,296

ELECTROMAGNETIC WAVE INTERCEPTOR

Filed Jan. 13, 1950 6 Sheets-Sheet 4

INVENTOR.
JOHN DRYSDALE REID
BY
Alden D. Redfield
Charles M. Hogan
ATTORNEYS

Sept. 9, 1952 J. D. REID 2,610,296
ELECTROMAGNETIC WAVE INTERCEPTOR
Filed Jan. 13, 1950 6 Sheets-Sheet 5
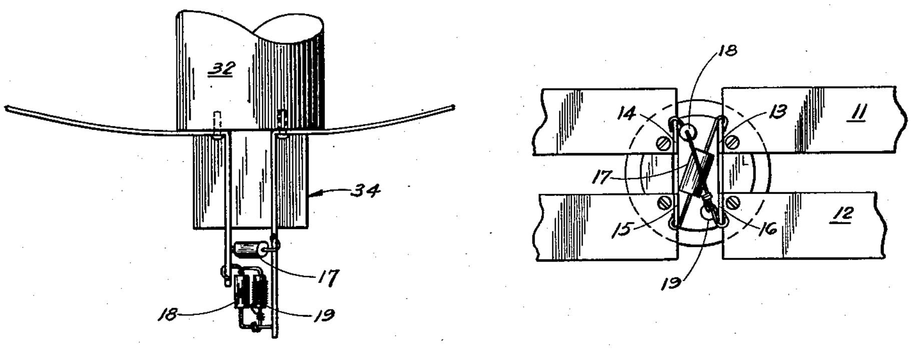
Fig. 12 Fig. 13
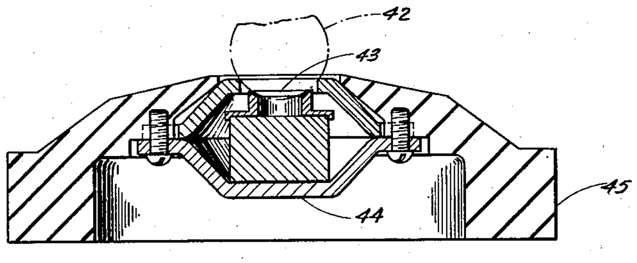
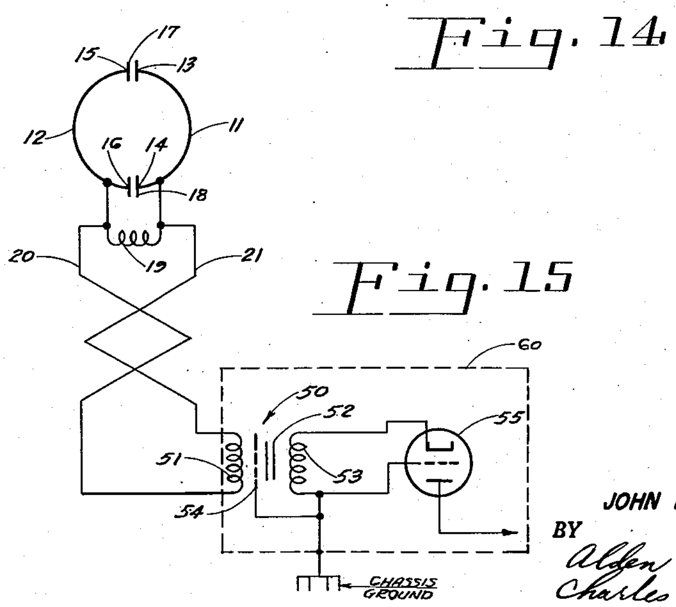
Fig. 14 Fig. 15
INVENTOR.
JOHN DRYSDALE REID
BY
Alden D. Redfield
Charles M. Hogan
ATTORNEYS INVENTOR.
JOHN DRYSDALE REID
BY
Alden D. Redfield
Charles M. Hogan
ATTORNEYS Patented Sept. 9, 1952 2,610,296

UNITED STATES PATENT OFFICE 2,610,296

ELECTROMAGNETIC WAVE INTERCEPTOR

John Drysdale Reid, Cincinnati, Ohio, assignor to Avco Manufacturing Corporation, Cincinnati, Ohio, a corporation of Delaware Application January 13, 1950, Serial No. 138,320

5 Claims. (Cl. 250—33.67)

The present invention relates generally to electromagnetic wave interceptors and methods of interception and specifically to a novel UHF or VHF indoor antenna which is of particular utility when used with television receivers and is primarily intended for such use. The invention also embraces a novel method of interception by sampling the magnetic field.

"Reflections and multipath signals present the most important and difficult problems in the television antenna system . . . . The duplicate image produced by the reflected signal is usually called a ghost . . . . With multiple reflections there may be multiple ghosts. The intensity of the ghost may be nearly as strong as the original image."—Grob, Basic Television, Principles and Servicing, pp. 404–405, McGraw-Hill Book Company, Inc., New York, 1949. In fact, the intensity of the ghost signal may be even greater than that of the so-called "direct ray," so that the ghost signal may be chosen for reception rather than the direct ray. The term "ghost signal" is accordingly herein used as synonymous with "undesired signal," recognizing that in some installations the reflected ray is selected for reception rather than the direct ray.

"The over-all effect of ghost signals is a general lowering of the resultant signal level and the appearance of annoying ghost images."—Kiver, Television Simplified, p. 50, D. Van Nostrand Co., Inc., New York, 1948. Positive ghosts are of such a nature as to tend to smear or duplicate the image, a black line in the picture being represented by a black line in the ghost, white picture elements being followed by a white ghost. Negative ghosts present the opposite appearance and are caused by reflected signals of such phase as to cause partial or complete cancellation of portions of the video modulation envelope. In many localities the presence of ghosts renders television reception so unsatisfactory that prior art means and methods of ghost elimination have failed. In urban areas such localities are very common, particularly in or in the vicinity of fireproof buildings and other massive structures. It so happens that, in general, in areas where the market for television receivers is greatest, areas of non-reception are most common. It is said that in some installations careful "placement of the antenna and utilization of its directive properties will help in decreasing (and many times eliminating) all but the desired direct wave."—Kiver, Television Simplified, p. 50—the antenna being "beamed" to accept or favor the strongest of the various propagated signals. The only characteristic of commercial television receiver antennas which can be utilized in an endeavor to reduce the undesirable effects of ghosts is directivity. Additionally, in some cases placement has been used to effect phase cancellation of a ghost, although this method, being critical to relative amplitudes, is in general unsatisfactory. Experience has shown that these expedients are in general unsuccessful, for the reason that they cannot discriminate against multiple ghosts and particularly ghosts which converge on the antenna at a small angle relative to the desired signal. The primary object of the present invention is to provide an antenna which is so effective in discriminating against ghosts or interference as to permit reception in all areas. It will be seen as the description proceeds that the antenna and method which the invention provides utilize different principles than those heretofore exploited in attempts at ghost suppression.

A common denominator of all indoor television antennas is that their optimum placement and orientation for purposes of best reception are determined by trial and error, because the standing wave pattern in an enclosure, such as the room in which a television receiver is installed, is so complex and dependent on particular installations that it is generally impossible to make an a priori calculation of optimum orientation and placement. In this sense all indoor antennas are inherently experimental devices. However, orientation and placement by trial-and-error is a well known and accepted technique in the art. The present invention shares that common denominator with other television receiver antennas, but it departs therefrom in this respect, among others: While prior art antennas are ineffective, even when these techniques are employed, to discriminate against ghosts or interference in many localities, the present invention accomplishes that desired objective and permits satisfactory reception when the same technique is practiced. A further object of the present invention is to provide a light-weight, universally mounted antenna construction of attractive appearance, thereby to facilitate the necessary placement and orientation without introducing unsightly, dangerous, expensive and complicated articulations.

The present invention is directed to another important object. It is characteristic of conventional indoor dipole antennas of adequate pickup, that they are affected by the body capacity of the operator. It is a matter of common experience for an operator to grasp a conventional antenna to place and orient it for satisfactory reception, then to walk away from the antenna and to "lose the picture." The picture is similarly affected by movements of persons and objects in the room. Another fundamental object of the invention is to provide an antenna which is substantially independent of and is not adversely affected by the body capacities of nearby persons and other objects.

The antenna provided in accordance with the invention is equally effective in discriminating against ghosts and the other forms of undesired R. F. signals, including such spurious interferences as are caused by oscillator radiation from nearby receivers, diathermy or other commercial high frequency installations, amateur transmitter harmonics, and co-channel and adjacent channel interference. It will therefore be understood that an object of the invention which is coextensive with the primary object mentioned above is to provide an antenna which effectively discriminates against interferences of the type just mentioned.

Another important object of the present invention is to provide a method of wave interception which permits acceptable reception in areas of the type above mentioned. This method comprises the steps of sampling a small portion of the magnetic field and simultaneously transposing and applying the resultant induced voltages to a balanced input circuit to confine the interception to that small portion of the magnetic field.

For a better understanding of the present invention, together with other and further objects, advantages and capabilities thereof, reference is made to the following description of the accompanying drawings.

In the drawings:

Figs. 12 and 13 are views corresponding to Figs. 6 and 7, respectively, but for the low band loop;

Fig. 14 is a cross section of the base used in both Fig. 1 and Fig. 8 embodiments;

Figs. 15 and 16 are symbolic illustrations of the band pass and tuned loop antenna circuits, Fig. 15 corresponding to Fig. 1 as to the antenna and also including a typical receiver input circuit;

Figs. 17 and 18 are aids employed in explaining the method of operation of the invention.

Figure 1:
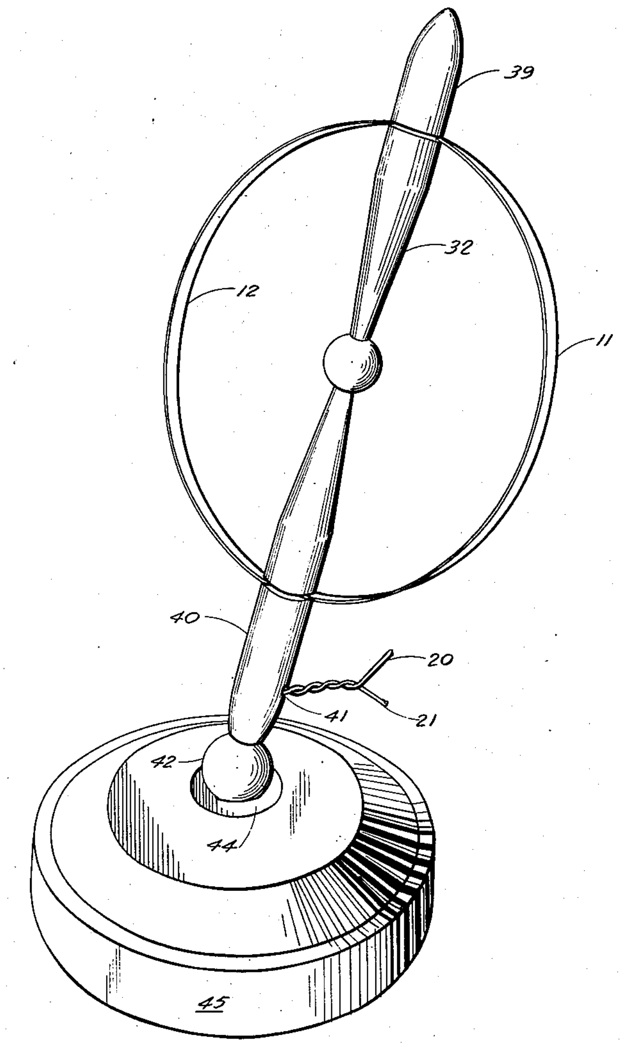
Fig. 1 is a perspective view of a high band single-turn loop antenna in accordance with the present invention.
Figure 2:
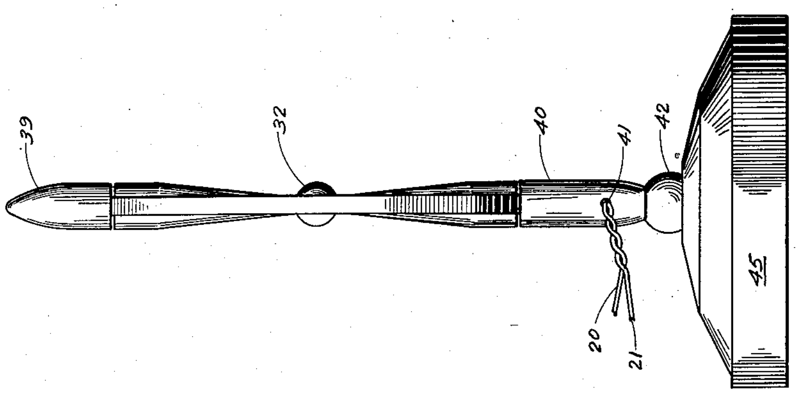
Figs. 2 and 3 are side and front views, respectively, of the Fig. 1 embodiment.
Figure 3:
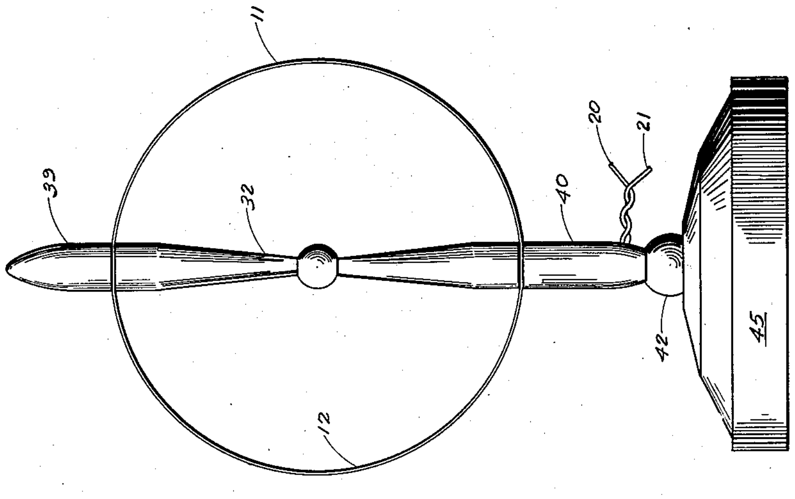

The product invention is based on the following directive concepts: First, the providing of a symmetrical loop antenna having a diameter of the order of $\frac{1}{10}$ or less of the wave length at the mean frequency of the band to be received. Second, the shielding and balancing of the television receiver antenna input circuit and transmission line to minimize pickup other than the loop antenna pickup. The first and more important of the directive concepts is discussed at length herein. The method invention is based on the above-mentioned two directive concepts plus a third directive concept which involves orientation and placement in such a manner as to achieve optimum results in discriminating against ghosts and interferences.

Standing wave patterns of television signals exist in all directions (within range of a broadcasting station) in areas which have boundaries defined by reflecting surfaces, such as the walls of houses or rooms, for example. I have originally observed that pronounced variations in television signal amplitude occur between closely spaced points in such locations, the spacing being of the order of one-half wave length, for example. The better the reflection and the more symmetrical the boundaries, the more pronounced is the standing wave pattern and the greater the range of variation in signal amplitude. This effect is particularly pronounced in locations, generally in closely built-up urban areas or in rugged terrain, where ghosts are so intense as hopelessly to distort television pictures, when prior art antennas are used. I have found that a loop antenna, having a diameter very small with respect to the wave lengths of received television signals, very advantageously exploits this effect to permit proper television signal reception in such areas, which areas have heretofore been regarded as unsuitable for television receiver installations. I have found that an antenna of small dimensions produces a much greater variation of signal amplitudes, on the order of 10:1, than that accompanying the use of a resonant dipole antenna, as the effects of various placements and orientations are measured. The standing wave patterns for the various indirect or reflected signals are different than the pattern for the signals directly propagated from the transmitter. Conventional antennas, such as a resonant dipole, having dimensions comparable to a half wave length of the received signals, are entirely dependent on directivity for ghost reduction and are unable to discriminate between nulls and maxima on one standing wave pattern or between various standing wave patterns. Conventional antennas are sensitive to the electrical components of the energy fields produced by the direct and reflected waves and in most localities it is impossible to find a zone in which such antennas are not energized to a substantial degree by both desired and interfering waves. I have discovered that it is practicable to employ an antenna which is primarily sensitive to the magnetic field and to make the zone so small (by making the antenna dimensions small) that the antenna is energized to a substantial degree by the magnetic field of a selected wave pattern only. My antenna functions in a manner independent of directivity and phase cancellation of signals and at the same time gives excellent signal pickup.

The present invention exploits the practicability of finding a location, in a given bounded area, where the magnetic field strength of the undesired spurious signals is small and that of the desired signal is relatively large. For purposes of illustrating the principle exploited by the invention, let it be assumed that a horizontally polarized direct uniform plane wave is transmitted in a horizontal direction from a source to a vertical reflecting surface. Such a wave travels with the velocity of light and consists of a field having magnetic and electrostatic components at right angles to each other and also at right angles to the direction of travel. Horizontal polarization is used for transmission in the VHF television and FM broadcast bands. The magnetic lines of force are in the vertical plane and the electric field vector is horizontal. The vertical reflecting surface may be the wall of a room. The usual room is bounded by vertical and horizontal surfaces. Because of the horizontal direction of propagation, reflections are most likely to occur at the vertical surfaces or walls. In the simplified case supposed, reflections from the floor and ceiling may be neglected.

The wave reflected from the wall will also be horizontally polarized. At any point in front of the wall (Fig. 17) the resultant electric field is represented by the vector sum of the fields of incident (direct) and reflected waves. For angles of incidence other than zero or ninety degrees, the electric vectors of the two fields will point in different directions, the angle between them being defined by the relation $$A=180°-2I$$

where

A is the angle between the two vectors, and

I is the angle of incidence.

However, the magnetic vectors for both direct and reflected waves are vertical. If reflection coefficient of unity be assumed, it is apparent that at certain zones parallel to the wall the time phases of the two magnetic fields differ by 180° and cancel each other out. At intermediate zones the magnetic fields are vectorially additive. However, as stated above, the two electric fields differ in direction and cannot cancel for angles of incidence other than zero or ninety degrees.

It follows from the foregoing discussion that it is usually impossible to find a zone in which an antenna sensitive to the electrical component of the field will not be energized, but the reverse is true of an antenna which is sensitive to the magnetic field. The antenna provided in accordance with the invention represents the execution of a directive concept involving a full appreciation of these phenomena, not heretofore exploited in ghost suppression.

Figures 16, 17:
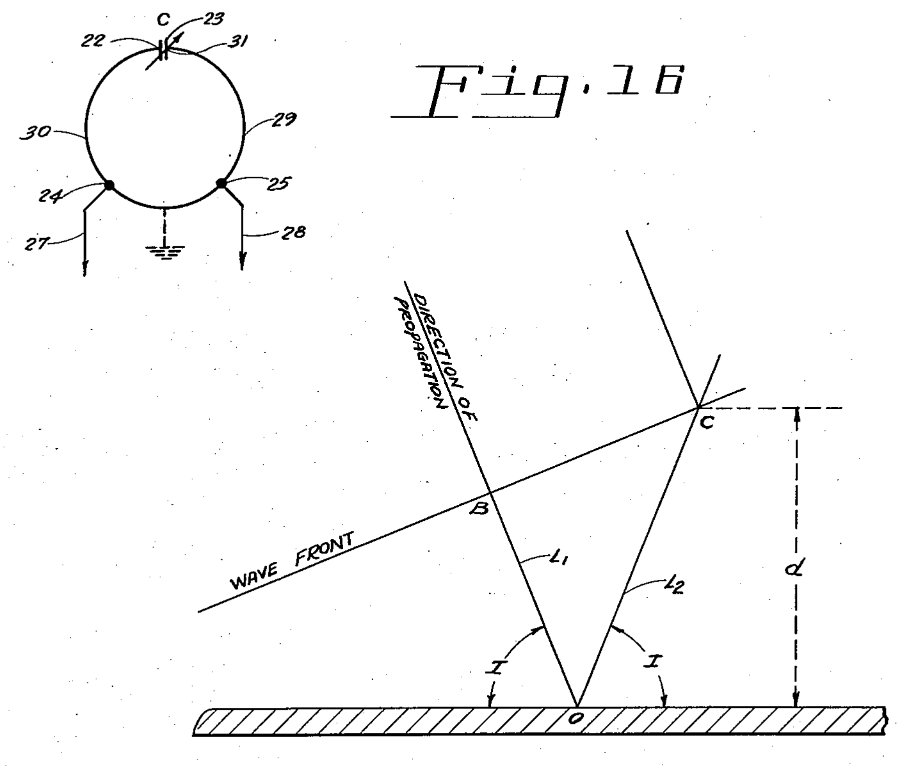

In Fig. 17, the line BC represents the wave front of the direct or incident wave. Line BO represents the direction of propagation, and angle I the angles of incidence or reflection, the latter being equal. C is a point affected by both incident and reflected rays, it being assumed that the incident wave is sufficiently wide along front BC to pass through point C. $d$ is the horizontal distance from point C to the reflecting surface. The difference S in path lengths between the incident and reflected waves at point C is equal to BO+OC.

$$\text{Let } BO=L_1$$

and $$OC=L_2$$

Then $$S=L_1+L_2$$

$$\frac{L_1}{L_2}=\cos(180°-2I)=-\cos 2I=2\sin^2 I-1$$

$$L_1=L_2(2\sin^2 I-1)$$

$$L_2=\frac{d}{\sin I}$$

$$\therefore L_1=\frac{(2\sin^2 I-1)d}{\sin I}$$

$$L_1+L_2=\frac{(2\sin^2 I-1)d}{\sin I}+\frac{d}{\sin I}=(2\sin^2 I+1-1)\cdot\frac{d}{\sin I}=2d(\sin I)$$

$$S=2d(\sin I)$$

Let $S=\lambda$, where $\lambda$ is one wave length $$\text{Then } d=\frac{\lambda}{2\sin I} \qquad (1)$$

$d$ then, is the distance between the reflecting plane and the nearest zone at which the magnetic fields cancel. $d$ is also the spacing between any two of such zones.

Figure 18:
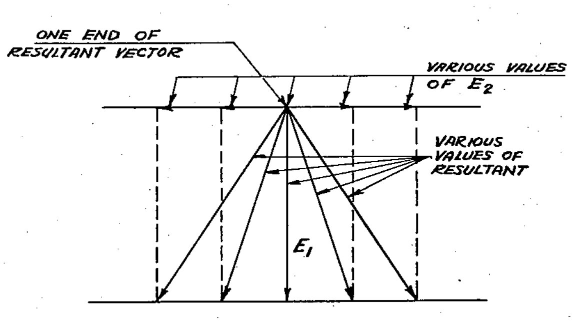

Fig. 18 shows the addition of two electrical vectors $E_1$ and $E_2$ representative of direct and reflected rays when the angle of incidence is equal to 45°, for example. The direction angle between the two vectors is 90°. The time phase between them depends on the distance from the wall. Assuming that the direct and reflected rays are equal in amplitude, it is evident that the vectorial sum varies in amplitude from ($E_1$) to ($1.414\times E_1$) and is never zero. On the other hand, as shown in (1) above, at certain zones the magnetic vectors, both being vertical, add or subtract, giving rise to a standing wave.

It is obvious that the hypothetical example just considered is greatly simplified but indicative of the problems involved. In practice multiple reflections and very complex standing wave patterns are generally present. These patterns may restrict the zones or planes of maximum and minimum magnetic field strength to very small areas. Therefore the magnetic field pickup device provided in accordance with the invention has dimensions small with respect to the wave lengths of the received signals.

I have empirically determined, when making tests and measurements with a device made in accordance with the concepts of the present invention, that the smaller the loop diameter, the more effective is the discrimination against undesired ghosts and interfering signals. On the other hand, when the diameter of the loop is increased, the amplitude of signal pickup increases. The preferred form of the invention comprises a loop having a diameter on the order of $\frac{1}{10}$ or less of the wave length at the mean frequency of the received signal band, and the specific dimensions mentioned represent a proper compromise between the demands of pickup, tending to require larger diameters, and the demands of discrimination, tending to require smaller diameters. In one embodiment of my invention I provide a multiplicity of turns of the loop inductor in order to increase pickup, while maintaining the same small diameter. I have found in practice that in locations where one or two ghosts are present, substantially complete ghost elimination can be achieved while adequate pickup is retained. I have further found that in locations where three or four ghosts are present, acceptable reception can be obtained while utilizing the preferred loop dimensions. These results represent an extension of ghost suppression which is not even approached by prior art antennas and methods. The accomplishment of these results by the present invention has been accompanied by the elimination of body capacity effects, a particularly annoying phenomenon attendant upon the use of prior art antennas and methods of indoor wave interception. It is further recognized that the polarization of the received signal waves deviates from the horizontal. However, it is nearly always possible to find a location and placement of my antenna such that desired signals of adequate intensity are picked up, while the intensity of undesired signals is so low as to be harmless.

The performance of a resonant dipole is impaired in indoor installations because of the distorted wave pattern existing indoors. I have found that in some locations an increase in received signal strength is effected by reducing the size below resonance of the dipole.

I have found that the sensitivity obtained in indoor installations with a tuned loop is equivalent to or greater than that obtained with the conventional tuned dipole, because of the above-mentioned distorted standing wave patterns. This limitation of the dipole type of antenna is accentuated in steel frame buildings.

Because of the higher Q characteristic of a tuned loop, the band width of a tuned loop is less than that of a resonant dipole of comparable size. Therefore, I disclose herein a band pass loop which for indoor installations gives pickup comparable to that of a resonant dipole. However, the small physical size of the loop provided in accordance with my invention and the absence of body capacity effects make such loops far superior for ghost elimination. I have also experimentally ascertained that the sensitivity of a tuned loop of a diameter of approximately five inches is substantially equal to that of a conventional resonant dipole which is optimized for the upper band embracing channels Nos. 7 through 13.

Figure 8:
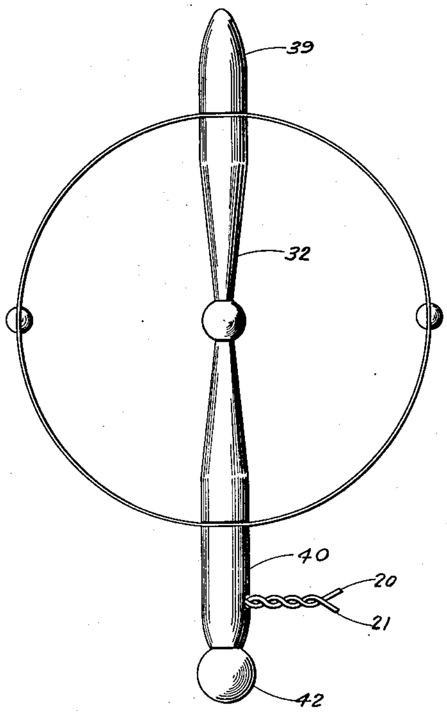
Figs. 8 and 9 are front and side views, respectively, of a two-turn low band loop antenna in accordance with the present invention.
Figure 9:
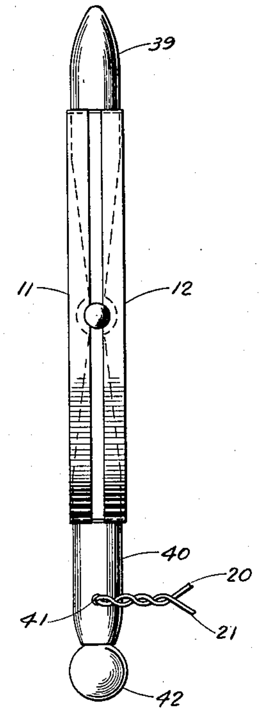
Figure 10:
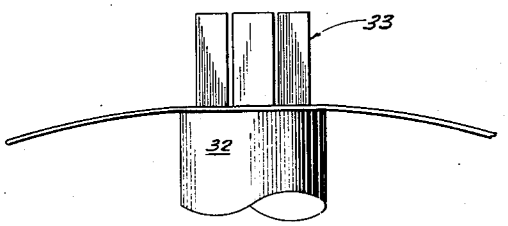
Figs. 10 and 11 are views corresponding to Figs. 4 and 5, respectively, but for the low band embodiment.
Figure 11:
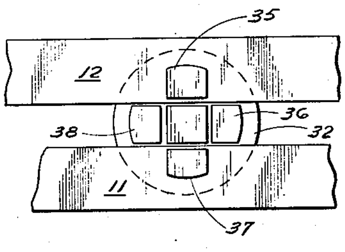

Reviewing the advantages of the present invention which have been ascertained by experiment:

(1) It is desirable that any form of indoor antenna should be readily movable in order to avoid signal nulls within the room—the invention possesses this characteristic;

(2) It is also desirable that any form of indoor antenna should be readily oriented and placed in order to ascertain the best location for minimizing ghosts and interference—the present invention satisfies this requirement to a much greater degree than prior art antennas;

(3) It is desirable that an indoor antenna be relatively free from body capacity effects, because such effects alone tend to render an antenna unsatisfactory—it has been observed that persons moving about the room will cause the signals to vary in strength and cause ghosts to make themselves manifest in the picture—the antenna provided by the invention, being essentially a magnetic pickup device, is not affected by or susceptible to these body capacity effects;

(4) The coupled band pass loop in accordance with the Figs. 1, 8 and 15 embodiments of the invention requires no tuning for either of the two bands for which it may be optimized, or no tuning for both bands when it is designed to cover both bands. Further, its operation is free from body capacity effects and it has a physical size such that reflections are minimized, in accordance with the theoretical considerations outlined herein;

(5) The tuned type of loop in accordance with the Fig. 16 embodiment of the invention, although it generally requires tuning for each channel, affords a sensitivity for an indoor installation which is greater than that of an indoor dipole, provides ghost cancellation and freedom from body capacity effects, and is at the same time of utility in increasing selectivity and minimizing spurious intermediate frequency and image responses.

The present invention is specifically intended for VHF and UHF wave interception. Its advantages are enhanced at the upper VHF or UHF bands because the movement required for proper antenna placement is less than that required when intercepting the lower band VHF signals. This antenna is in an entirely different category from low frequency antennas and is not intended for or suitable for such use, because the distance of required movement then becomes very great, and further because standing wave patterns for low frequency propagation are either non-existent or very weak, the surfaces which function as reflectors being of small dimensions relative to the wave lengths involved at low frequencies and therefore inefficient as reflectors.

It is of the essence of the present invention that a small portion of the magnetic field be sampled and that the diameter of the loop be small by comparison with the wave lengths of the signals to be received. The diameter of the loop should be less than one-tenth wave length of the mean frequency signals to be received. I have made this diameter small with respect to the wave length in order to achieve the advantages discussed herein.

In accordance with the invention there is provided a television receiver antenna system (Fig. 15) comprising the combination of a magnetic pickup device formed of a pair of conductors symmetrically arranged in a loop configuration, each of said conductors having two terminals, said loop having a diameter of the order of $\frac{1}{10}$ or less of the wave length of the mean-frequency television signals to be received, a capacitor connected to a pair of adjacent terminals of said loop to tune the circuit comprising the capacitor itself and the loop to the geometrical mean of the band of television signals to be received, a resonant circuit comprising a parallel capacitor and inductor subcombination connected to the remaining pair of adjacent terminals of said loop, said resonant circuit being independently tuned to the geometric mean of said band, said resonant circuit and the circuit comprising said loop constituting a band pass selector network, a balanced input receiver circuit and a twisted-pair transmission line connected between said inductor and said receiver circuit, said input circuit and transmission line cooperating to confine wave interception to said pickup device, and the dimensions of said pickup device being such as to render it substantially sensitive to the magnetic field only.

Continuing with the specific description of the band-pass-loop form of the invention illustrated in Fig. 15, it comprises a magnetic pickup device formed of a pair of conductors 11 and 12. These conductors are symmetrically arranged in a circular loop configuration. Conductor 11 has integral terminals 13 and 14 and conductor 12 has integral terminals 15 and 16. The loop has a diameter of the order of $\frac{1}{10}$ or less of the wave length of the mean frequency television signals to be received. A capacitor 17 is connected to adjacent terminals 13, 15 of said loop in order to tune the circuit comprising the capacitor 17 and the loop to the geometric mean of the band of television signals to be received. In the case of a high band loop that geometric mean is approximately 193 megacycles. A suitable loop diameter is five inches. A suitable value for capacitor 17 is 1 micromicrofarad. A satisfactory value for capacitor 18 is 75 micromicrofarads. The antenna system also comprises a resonant circuit, consisting of a parallel subcombination of a capacitor 18 and an inductor 19, connected to terminals 14, 16. This resonant circuit is independently tuned to the geometric mean of the band to be received. That mean is approximately 193 megacycles in the case of the high band, which extends from 174 to 216 megacycles. This resonant circuit and the loop circuit constitute a band pass selector network to pass the upper television band. The antenna system also comprises a balanced receiver input circuit generally designated by the reference numeral 50, and a twisted-pair transmission line 20, 21 connected between the inductor 19 and the input circuit 50. In order to obtain the full benefits of the invention it is necessary to minimize line pickup and other stray pickup. Accordingly, my novel antenna is used with a balanced input type of receiver. Such an input circuit is insensitive to push-push pickup. Additionally the transmission line 20, 21 is insensitive to push-pull pickup, because it utilizes the transposition principle while applying the pickup voltage to the balanced input circuit 50. The balanced input circuit 50 and the transmission line 20, 21 cooperate to confine substantial wave interception to the loop 11, 12 only and the dimensions of the loop are such as to render it sensitive substantially to the magnetic field only. The metallic shield indicated by the reference numeral 60 in Fig. 15 is provided in order to prevent stray pickup in the receiver circuits themselves. It will be understood from the foregoing that the invention embraces the method of intercepting wave signal energy for a television receiver of the type having a balanced input circuit insensitive to push-push pickup which comprises the steps of loop-sampling a small portion of the magnetic field, positioning and orienting the sampler to minimize ghost signals, then applying to the receiver the signals picked up by the sampler through a line insensitive to push-pull pickup.

The balanced input circuit illustrated in Fig. 15 comprises an input transformer having a primary 51, an iron core 52 and a secondary 53. One terminal of the secondary and an electrostatic shield 54 are connected to the chassis as shown. The secondary is connected between the control electrode and cathode of an RF amplifier tube 55. It will be understood that the transmission line 20, 21 may be tapped down on inductor 19 to provide the desired impedance match. The embodiment of the antenna which is shown symbolically in Fig. 15 is shown in a practical physical form in Figs. 1 through 7. It will of course be understood that the symbols utilized in Fig. 15 are equally applicable to an antenna which is designated for dual band reception or reception in the low television band extending from 54 to 88 megacycles. The specific parameters mentioned above have been found to be entirely satisfactory for a high band loop but I do not desire to be restricted to these parameters, which are given for purposes of illustration and not of limitation.

Figure 19:
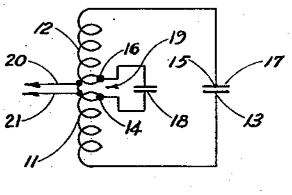
Fig. 19 is a circuit diagram equivalent to that shown in Fig. 15, as to the antenna.

Fig. 19 is a circuit equivalent of the loop circuit shown in Fig. 15, together with the inductor 19 and the capacitor 18. The inductors 11 and 12 function as a magnetic pickup device and are embraced in a loop circuit which is tuned to the geometric mean of the band to be received by capacitor 17. Additionally, the resonant circuit comprising inductor 19 and capacitor 18 is independently tuned to the same geometric mean. The two circuits are tightly coupled to provide a band pass response by means of the common capacitor 18.

Referring now to Fig. 16, there is symbolically shown an embodiment of my pickup device which is adapted to be tuned by the operator of the receiver to any one channel within the band to be received. This embodiment comprises a single-turn inductor consisting of portions 29 and 30, arranged in a circular loop configuration. Between integral terminals 22 and 31 of the loop conductor 29, 30 is connected a tuning capacitor 23. A twisted pair transmission line 27, 28 is connected to the loop at points 24, 25 in order to obtain the desired impedance match. I have found that a loop antenna having the following parameters operates in a very satisfactory manner:

| | |
|---|---|
| Conductor 29, 30 | ¼ inch copper tubing |
| Diameter of loop | 4¾ inch |
| Value of capacitor 23 at 216 megacycles per second | 2 micromicrofarads |
| Value of capacitor 23 at 54 megacycles per second | 42 micromicrofarads |

I have found that this type of loop produces satisfactory results on all television channels, the sensitivity obtained being comparable to that of a tuned dipole, particularly on the upper band. The small physical size and the absence of body capacity effects impart to this type of loop the superior attributes characteristic of the invention. The tuned type of loop (Fig. 16) is shown herein symbolically only and it will be understood that both of the embodiments (Figs. 1, 8) which are physically illustrated are of the band pass type.

Figure 4:
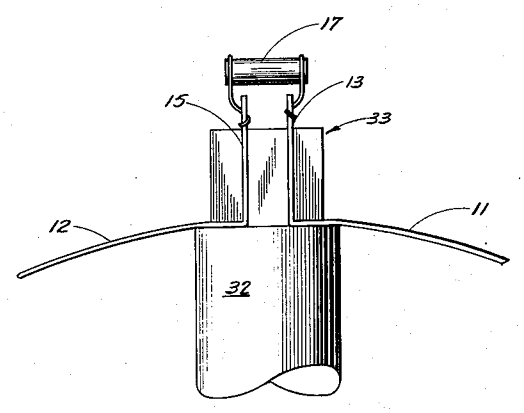
Figs. 4 and 5 are exploded fragmentary views showing front and top details of the portions of the assembly normally concealed by cap 39, for the high band loop antenna.
Figure 5:
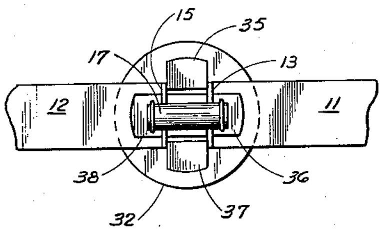
Figure 6:
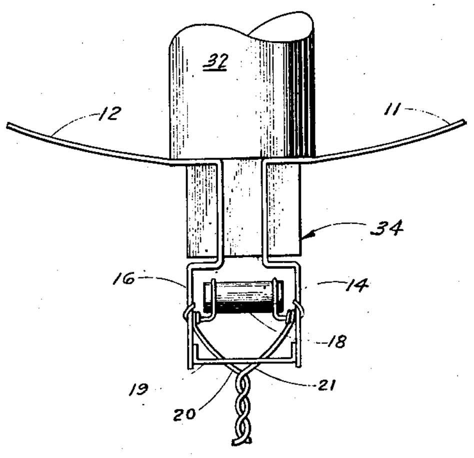
Figs. 6 and 7 are fragmentary exploded views showing in detail the front and bottom portions of those parts of the assembly normally enclosed by well 40, for the high band loop antenna.
Figure 7:
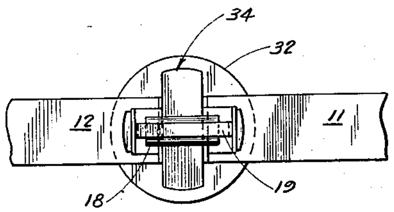

The Fig. 1 embodiment corresponds to the pickup device symbolically shown in Fig. 15 and like reference numerals are used for like elements. This device possesses an attractive and stimulating appearance. It comprises a pair of arcuate conductors 11 and 12, the end terminals 13, 14, 15 and 16 of which are secured as shown (Figs. 4, 5, 6 and 7) to the ends of a diametrically disposed support 32. This support is formed at each end with a reduced extension of cruciform section. The cruciform extensions are designated by the reference numerals 33 and 34, the upper extension being illustrated in Figs. 4, 5, and the lower extension being illustrated in Figs. 6, 7. The end terminals 13, 15 of the loop are bent at right angles and provided with apertures which interfit with lugs included in the upper cruciform section, such section consisting essentially of a collection of outstanding lugs such as those numbered 35, 36, 37 and 38. The terminals of capacitor 17 are secured to the leads 13 and 15 as shown in Figs. 4, 5 and the parallel combination of capacitor 18 and inductor 19 is secured to the terminals 14, 16 as indicated in Figs. 6, 7. Pressed on to the cruciform section 33 in such a manner as to enclose and protect capacitor 17 is a cap 39. The cruciform section 34, together with its associated capacitor 18 and inductor 19, is similarly enclosed by a well member 40, which is provided with an aperture 41 from which a twisted-pair transmission line 20, 21 is projected. At the end of and secured to the well member 40 is a metallic ball 42 which interfits with a magnetic cup 43, disposed within a magnetic-circuit-providing member 44, contained in a pocket in a plastic base 45.

Suitable parameters for a high band antenna in accordance with Figs. 1 and 15 have already been mentioned. An antenna of this character may also be provided for both bands and the following suggested parameters may then be employed:

| | | |
|---|---|---|
| Capacitor 17 | microfarads | 10 |
| Capacitor 18 | do | 5 |
| Tuning of loop circuit | megacycles | 108 |
| Tuning of inductor 19 and capacitor 18 | do | 108 |
| Diameter of loop | inches | 5 |

Referring now specifically to Figs. 8 through 13, there is shown an embodiment of the invention which is particularly suitable for low band reception. The circuit equivalents of this embodiment are shown in Figs. 19 and 15. The Fig. 8 embodiment is generally similar to that shown in Fig. 1, in physical appearance, but it comprises two turns instead of one turn. In this embodiment of Fig. 8 both capacitors 17 and 18 are mounted on the lower cruciform extension. Suitable parameters for this embodiment are as follows:

| | | |
|---|---|---|
| Diameter of loop | inches | 5 |
| Capacitor 17 | micromicrofarads | 5 |
| Capacitor 18 | do | 75 |
| Tuning of loop circuit | megacycles | 69 |
| Tuning of circuit of inductor 19 | do | 69 |

Coming now to the operation of the antenna system provided in accordance with the invention, the loop 11, 12 is essentially a sampler. The operator positions and orients it and moves it about the room until he observes the absence of ghost signals and until he finds that the picture on the receiver screen is optimized. This method is called "loop-sampling." The loop is universally mounted by means of magnetic ball 42 in order to facilitate this process. The ball 42 is strongly attracted to the cup 43 by magnetic forces but the slidable articulation is such as to permit orientation of the loop 32 in various vertical, diagonal and horizontal planes. Therefore, the loop is referred to as being universally mounted. The loop samples a small portion of the magnetic field and is operated on the principles discussed above. The loop circuit and the circuit of the inductor 19 and capacitor 18 provide a band pass network having the well known double humped pass band characteristic whereby signals in the desired band are passed to the receiver input circuit. These signals are applied to the receiver input circuit through a transmission line which is insensitive to push-pull pickup. The receiver itself has an input circuit which is insensitive to push-push pickup, so that all pickup in the system is effectively confined to the loop itself and to a small portion of the magnetic field. The resolving power in the antenna in discriminating between desired and undesired signals is very high for reasons hereinbefore mentioned.

While there have been shown and described what are at present considered to be the preferred embodiments of the present invention, it will be obvious to those skilled in the art that various modifications and substitutions of equivalents may be made therein without departing from the true scope of the invention as defined by the appended claims.

I claim:

1. A television receiver antenna system comprising the combination of a magnetic pickup device formed of a pair of conductors symmetrically arranged in a loop configuration, each of said conductors having two terminals, said loop having a diameter of $\frac{1}{10}$ or less of the wave length of the mean-frequency television signals to be received, a capacitor connected to a pair of adjacent terminals of said loop to tune the circuit comprising the capacitor itself and the loop to the geometrical mean of the band of television signals to be received, a resonant circuit comprising a parallel capacitor and inductor connected to the remaining pair of adjacent terminals of said loop, said resonant circuit being independently tuned to said geometric mean, said resonant circuit and the circuit comprising said loop constituting a band pass selector network, a balanced input receiver circuit and a twisted-pair transmission line connected between said inductor and said receiver circuit, said input circuit and transmission line cooperating to confine wave interception to said pickup device, and the dimensions of said pickup device being such as to render it substantially sensitive to the magnetic field only.

2. A television receiver antenna system comprising the combination of a magnetic pickup device formed of a pair of conductive ribbons symmetrically arranged in a loop configuration, each of said conductors having two terminals, said loop having approximately a five-inch diameter, a capacitor of 1 micromicrofarad connected to a pair of adjacent terminals of said loop to tune the circuit comprising the capacitor itself and the loop to 193 megacycles (the geometric mean of the high band of television signals to be received, extending from 174 to 216 megacycles), a resonant circuit comprising a parallel capacitor of 75 micromicrofarads and inductor subcombination connected to the remaining pair of adjacent terminals of said loop, said resonant circuit being independently tuned to said geometric mean, said resonant circuit and the circuit comprising said loop constituting a band pass selector network to pass the upper television band, a balanced input receiver circuit and a twisted-pair transmission line between said inductor and said receiver circuit, said input circuit and transmission line cooperating to confine wave interception to said pickup device, and the dimensions of said pickup device being such as to render it substantially sensitive to the magnetic field only.

3. A television receiver antenna system comprising the combination of a magnetic pickup formed of a pair of conductors symmetrically arranged in a loop configuration, each of said conductors having two terminals, said loop having approximately a five-inch diameter, a capacitor of 10 micromicrofarads connected to a pair of adjacent terminals of said loop to tune the circuit comprising the capacitor itself and the loop to the geometric mean (108 megacycles) of the two bands of television signals to be received (extending from 54 to 216 megacycles), a resonant circuit comprising a parallel capacitor of 5 micromicrofarads and an inductor connected to the remaining pair of adjacent terminals of said loop, said resonant circuit being independently tuned to said geometric means, said resonant circuit and the circuit comprising said loop constituting a band pass selector network covering both upper and lower television bands, a balanced input receiver circuit and a twisted-pair transmission line connected between said inductor and said receiver circuit, said input circuit and transmission line cooperating to confine wave interception to said pickup device, and the dimensions of said pickup device being such as to render it substantially sensitive to the magnetic field only.

4. A television receiver antenna system comprising the combination of a magnetic pickup device formed of a pair of conductors symmetrically arranged in a two-turn loop configuration, each of said conductors having two terminals, said loop having approximately a five-inch diameter, a capacitor of 5 micromicrofarads connected to a pair of adjacent terminals of said loop to tune the circuit comprising the capacitor itself and the loop to the geometric mean (69 megacycles) of the low band of television signals to be received (extending from 54 to 88 megacycles), a resonant circuit comprising a parallel capacitor of 75 micromicrofarads and inductor subcombination connected to the remaining pair of adjacent terminals of said loop, said resonant circuit being independently tuned to said geometric mean, said resonant circuit and the circuit comprising said loop constituting a band pass selector network for the lower television band, a balanced input receiver circuit and a twisted-pair transmission line connected between said inductor and said receiver circuit, said input circuit and transmission line cooperating to confine wave interception to said pickup device, and the dimensions of said pickup device being such as to render it substantially sensitive to the magnetic field only.

5. A television receiver antenna circuit comprising the combination of a pickup device formed of a pair of conductors symmetrically arranged in a loop configuration, each of said conductors having two terminals, said loop having a diameter of $\frac{1}{10}$ or less of the wave length of the mean-frequency television signals to be received, a capacitor connected to a pair of adjacent terminals of said loop to tune the circuit comprising the capacitor itself and the loop to the geometrical mean of the band of television signals to be received, and a resonant circuit comprising a parallel capacitor and inductor subcombination connected to the remaining pair of adjacent terminals of said loop, said resonant circuit being independently tuned to the geometric mean of the band of television signals to be received, said resonant circuit and the circuit comprising said loop constituting a band pass selector network.

JOHN DRYSDALE REID.

REFERENCES CITED

The following references are of record in the file of this patent:

UNITED STATES PATENTS

| Number | Name | Date |
|---|---|---|
| 2,318,516 | Newbold | May 4, 1943 |
| 2,351,723 | Vogel | June 30, 1944 |
| 2,372,651 | Alford et al. | Apr. 3, 1945 |
| 2,405,123 | Fyler | Aug. 6, 1946 |
| 2,467,961 | Caraway et al. | Apr. 19, 1949 |
| 2,501,430 | Alford | Mar. 21, 1950 |
| 2,510,634 | Hull | June 6, 1950 |

FOREIGN PATENTS

| Number | Country | Date |
|---|---|---|
| 276,002 | Great Britain | Apr. 5, 1928 |